United States Patent [19]

Hensel et al.

[11] Patent Number: 4,687,700

[45] Date of Patent: Aug. 18, 1987

[54] ABRASION-RESISTANT POLYESTER CARRIER FILM FOR MAGNETIC INFORMATION MEDIA

[75] Inventors: Hartmut Hensel, Schlangenbad; Hermann Dallmann, Wiesbaden, both of Fed. Rep. of Germany

[73] Assignee: Hoechst Aktiengesellschaft, Frankfurt, Fed. Rep. of Germany

[21] Appl. No.: 723,700

[22] Filed: Apr. 16, 1985

[30] Foreign Application Priority Data

Apr. 16, 1984 [DE] Fed. Rep. of Germany ....... 3414347

[51] Int. Cl.$^4$ .................... B32B 31/30; B32B 31/20; B32B 27/36
[52] U.S. Cl. ................. 428/213; 156/244.11; 156/244.24; 428/323; 428/336; 428/480; 428/694; 428/900; 428/910
[58] Field of Search ............. 428/694, 695, 900, 323, 428/480, 213, 215; 156/244.11, 244.24

[56] References Cited

U.S. PATENT DOCUMENTS

| 4,198,458 | 4/1980 | Mitsuishi et al. | 428/212 |
|---|---|---|---|
| 4,375,494 | 3/1983 | Stokes | 428/323 |
| 4,550,049 | 10/1985 | Ono et al. | 428/694 |
| 4,568,599 | 2/1986 | Ono et al. | 428/900 |

FOREIGN PATENT DOCUMENTS

| 2133895 | 1/1972 | Fed. Rep. of Germany | 260/40 R |
|---|---|---|---|
| 2647713 | 4/1977 | Fed. Rep. of Germany | |
| 3019073 | 11/1980 | Fed. Rep. of Germany | 521/54 |

Primary Examiner—Paul J. Thibodeau
Attorney, Agent, or Firm—James C. Lydon

[57] ABSTRACT

An abrasion-resistant, multilayer biaxially oriented carrier film for magnetic information media is described, composed of a base layer (A) comprising a thermoplastic polymer matrix of essentially linear aromatic polyester, containing finely distributed solid particles to improve the surface roughness which determines the slip properties of the film, and of at least one homopolyester cover layer (B) applied to one of the two surfaces of base layer (A). The characterizing features of the carrier film described lie in the fact that base layer (A) contains solid particles in an amount from 0.001 wt. % to 10 wt. % based on the weight of the polymer forming base layer (A), whereby the average particle size of the solid particles lies in the range from 0.3 to 20 microns, by the fact that cover layer (B) comprises a thermoplastic polymer matrix of essentially linear aromatic homopolyester, in which finely distributed solid particles in an amount from 0 to 10 wt. % based on the weight of the polymer forming cover layer (B) are embedded, whereby the solid particles have an average particle diameter of less than 0.3 micron, and by the fact that the layer thickness of cover layer (B) is a maximum of 40% of the layer thickness of base layer (A).

16 Claims, No Drawings

ABRASION-RESISTANT POLYESTER CARRIER FILM FOR MAGNETIC INFORMATION MEDIA

BACKGROUND OF THE INVENTION

The invention relates to an abrasion-resistant, multilayer, biaxially oriented carrier film for magnetic information media, composed of a base layer A, comprising a thermoplastic polymer matrix made of essentially linear aromatic polyester, containing finely distributed solid particles to improve its surface roughness, which determines the slip properties of the film, and of at least one cover layer B, applied to one of the two surfaces of base layer A.

Biaxially oriented films of polyesters, especially polyethylene terephthalate, because of their superior properties such as tensile strength, tear resistance, modulus of elasticity, transparency, chemical resistance, thermal resistance and the like are used in large quantities in many technical areas, for example also as carriers for magnetic recording media.

However, the polyester films must have a specific combination of properties. Thus, for example polyester films to be processed into magnetic tapes to be used for audio, video, or computer technology must have a low coefficient of friction and a high abrasion resistance and must not be sensitive to deterioration of their electromagnetic transmission properties.

Methods are already known for improving the properties of polyester films by incorporating fine particles of an inert material into the films, for example by using one of the methods listed below:

(1) In general, the residue of metallic compounds used as re-esterification catalysts is precipitated in the system by special measures in the form of finely distributed particles (termed the "precipitation method"); and/or (2) microparticles of an inorganic or organic compound with different particles sizes are added from the outside (termed the "addition method").

Single-layer film containing finely distributed organic particles are described for example in German Offenlegungsschrift No. 30 19 073. Films which contain inorganic particles to improve their slip properties are described in German Auslegeschrift No. 21 33 895 and German Patent 26 47 713. These films are single-layer films and therefore have on both surfaces a surface roughness which depends on the number of particles or the diameter of the particles added in each particular case.

To reduce the surface roughness of the surfaces of films intended for receiving a magnetic coating, multilayer films are also manufactured which are composed of a first layer of thermoplastic polymer without particles added, which has a comparatively smooth surface, and a second, thinner layer, provided with particles in the usual fashion.

It has been found that the greatest disadvantage of particles incorporated into conventional polyester films for the purpose of improving the slip of the film lies in their lack of affinity for the polymer material and their tendency to form agglomerates. For this reason, the friction between such conventional films with one another or between such a film or films, which causes for example the formation of white dust or deposits on the films used for magnetic tapes. These deposits are extremely undesirable since they settle in the equipment used to play the magnetic tapes, causing damage therein.

If the particles which are normally distributed uniformly in the polymers forming the individual layers are deposited very close to the surface of the layer, friction during winding or rewinding of tapes that are already coated on one side with a magnetic coating or of films that are not yet coated, the extremely thin polymer layer flakes covering the particles can be loosened, releasing the particles embedded beneath. The extremely thin polymer layer flakes, however, adhere very strongly to the film as a result of an electrostatic charge and, since the tape is wound, can be transferred to the magnetic coating, thereby causing undesirable disturbing effects such as weakening of the signals, e.g. in the form of so-called "drop outs". In addition, the released solid particles penetrate the magnetic coating causing deformations and eventually signal losses or distortions as well. These disturbing effects, summarized under the term "abrasion behavior" in the least favorable case render the magnetic tapes produced from these carrier materials unusable for a designated application such as video, audio, or computer tapes. These considerations also apply to flexible disks (floppy disks).

Therefore, the object of the present invention is to proceed on the basis of the demonstrated state of the art to create a carrier film for magnetic information media, which (1) has a low surface roughness on the surface designated to receive the magnetic coating, (2) has a high surface roughness which determines the slip properties on the surface opposite the magnetic coating, (3) has sufficiently high strength in the lengthwise and transverse directions to allow manufacture of extremely thin tapes with extremely high signal density, and (4) has excellent abrasion behavior, so that even when the film is subjected to considerable frictional stress, no deposits can be seen on its surface.

SUMMARY OF THE INVENTION

The present invention relates to an abrasion-resistant, multilayer, biaxially oriented carrier film for magnetic information media comprising (i) a polyester substrate layer having from 0.001 weight percent to 10 weight percent, based upon the weight of the polyester forming said substrate layer, of finely distributed solid particles having an average particle size of from 0.3 to 20 microns; and (ii) a homopolyester cover layer applied to at least one of the two surfaces of said polyester substrate, said homopolyester cover layer having a maximum thickness of 40% of the thickness of said polyester substrate, and having from 0 to 10 weight percent, based upon the weight of the homopolyester forming said homopolyester cover layer, of finely distributed solid particles having an average particle diameter of less than 0.3 micron.

The present invention also relates to a coextrusion process for manufacture of abrasion-resistant films having a polyester substrate and at least one homopolyester cover layer applied thereto, said film manufactured by a coextrusion process comprising (i) separately plasticizing the polyester and homopolyester resins which are to form the layers of said film;

(ii) combining said plasticized resins and extruding said resins in sheet-like form through a coextrusion nozzle;

(iii) contacting the combined, multilayer extrudate upon a cooling roller, thereby cooling said extrudate in an unstretched state;

(iv) biaxially orienting said cooled multilayer extrudate to form a biaxially oriented multilayer polyester film;

(v) heat-fixing said biaxially oriented multilayer polyester film, with the proviso that the thickness of said homopolyester cover layer may be varied by either (A) regulating the speed at which the plasticized polyester resins are permitted to pass to said coextrusion nozzle, or (B) regulating the speeds of the extruders.

DETAILED DESCRIPTION OF THE INVENTION:

As summarized above, the object of the present invention is achieved by a carrier film belonging to the species recited hereinabove, whose characterizing features consist in the fact that the base layer A contains solid particles in an amount of 0.001 wt. % to 10 wt. %, based on the weight of the polymer forming base layer A, whereby the average particle size of the solid particles is in the range from 0.3 to 20 microns, by the fact that cover layer B comprises a thermoplastic polymer matrix of essentially linear aromatic homopolyester, in which solid particles in finely distributed form are embedded in an amount from 0 to 10 wt. %, based on the weight of the polymer forming cover layer B, whereby the solid particles have an average particle diameter of less than 0.3 micron, and by the fact that the layer thickness of cover layer B is a maximum of 40% of the layer thickness of base layer A.

Base layer A can comprise polyester homopolymers, obtained by polycondensation of ethylene glycol for example, with terephthalic acid or naphtholinic acid. Layer A can also be composed of mixtures of various homopolyesters as well as mixtures or blends of polyester homopolymers with other polymers as for example polyolefin homo- or copolymers, polyamides, polycarbonates, ionomers, etc. Preferably it comprises polyethylene terephthalate. It contains solid particles in finely distributed form in an amount of preferably 0.001 to 5 wt. %, especially preferably from 0.001 to 1 wt. %, always based on the weight of the polyethylene terephthalate forming base layer A. The particles can be of an inorganic or even an organic material, and precipitates of catalyst residues or mixtures of all three types of particles may be used. Examples include one or more of the following materials: silicon dioxide, as for example hydrophobic pyrogenic silicic acid, natural silicon dioxide and diatomaceous earth silicon dioxide; synthetic and natural silicates such as kaolin; natural and pyrogenic aluminum dioxide and aluminum hydroxide; calcium carbonate; barium sulfate; titanium dioxide; carbon black; metal particles as for example those of aluminum, copper, iron, etc.; magnetic particles as for example barium ferrite; particles of polymer materials as for example plastomers, elastomers, and duromers.

The particles can additionally be coated with an adhesion promoter for better adhesion to the matrix.

The finely distributed particles have an average particle size of preferably 0.3 to 15 microns, especially preferably from 0.5 to 5.0 microns.

A cover layer B is applied to at least one of the surfaces of base layer A. Cover layer B has a layer thickness which is less than the layer thickness of base layer A, with cover layer B preferably having a thickness of a maximum of 30%, especially preferably a maximum of 15% of the layer thickness of base layer A. Cover layer B preferably comprises polyethylene terephthalate, in which very finely distributed solid particles are embedded in an amount from preferably 0 to 5 wt. %, especially preferably 0 to 2 wt. %, and very especially preferably 0 wt. %, always based on the weight of the polyethylene terephthalate forming cover layer B. The solid particles have a particle diameter of preferably on average smaller than 0.2 micron, especially preferably smaller than 0.1 micron.

The solid particles can be made of the same materials as already described for base layer A, but the same particles need not always be used for both the base layer and the cover layer, but particles of materials other than those incorporated in the base layer may be used for the cover layer.

At least one of the layers can contain additional additives as for example agents to promote slipping and sliding as for example polysiloxane, polyether- or polyestersiloxane, fatty acid esters as well as antistatic agents, anti-oxidants and the like.

Cover layer B is intended to cover the particles which influence the surface roughness of base layer A, said particles being incorporated into base layer A, to the point where two conditions are fulfilled:

1. The surface roughness remaining after application of layer B, said roughness being produced by the particle-conditioned surface structuring of layer A, which partially penetrates cover layer B or which in any case also produces a certain surface structuring of cover layer B, must be sufficiently large to produce frictional characteristics in the film which positively influence the winding of the film as well as the playing behavior of magnetic tapes manufactured from the film.

2. The particles must be sufficiently far removed from the free surface of cover layer B to prevent the particles from tearing free, thereby preventing abrasion.

In a special embodiment of the invention, the film has a three-layer structure, comprising a base layer A, in which cover layers B, B' are applied to both surfaces. The base layer then has the composition described previously in the specification. A film coated on one side has a very specific surface roughness on the side opposite cover layer B, said roughness being dependent upon the number of particles added in each case and the average particle diameter of the particles added. However, the magnetic layer should be applied to a film surface which is essentially free of roughnesses, so that the magnetic coating will not be influenced by the roughness of the substrate, but will have a layer thickness which is as uniform as possible. This is intended primarily to prevent signal losses from occurring at points where the layer thickness is less when the tapes are played.

To offer a smooth surface for the magnetic coating to be applied, both surfaces of base layer A according to the present invention are coated with cover layers B and B' of the composition described hereinabove. The layer thickness of cover layer B', which is applied to the side of the base layer intended for application of the magnetic coating, is selected so that the irregularities produced in the surface of base layer A because of the particles contained in base layer A are markedly reduced in the surface of cover layer B'. Preferably, the layer thickness of cover layer B' on the side of the carrier film intended for coating with the magnetic coating is 0.1 to 3 microns, especially preferably 0.1 to 2 microns.

In the especially preferred embodiment of the invention, cover layer B' comprises pure polyethylene terephthalate, into which no solid particles are incorporated. However, in order to produce an additional surface which influences the frictional characteristics of the film, solid particles with the specified particle size of 0.3 micron maximum may be present in cover layer B'.

Cover layer B, applied to the side of base layer A opposite the surface on which the magnetic coating is to be applied, should have a layer thickness such that the surface structure of the base layer thereunder can still be detected; preferably the layer thickness is 0.1 to 1 micron, especially preferably 0.1 to 0.5 micron. Cover layer B in the especially preferred embodiment of the invention comprises pure polyethylene terephthalate, into which no solid particles are incorporated; however in order to achieve an additional surface partial structuring in individual cases, solid particles with the specified particle sizes of a maximum of 0.3 micron can be present in cover layer B.

The carrier film described above is manufactured by the extrusion method, preferably by the coextrusion method, especially preferably by the coextrusion method using a multilayer nozzle, in which the separately prepared melt flows are combined by superimposing them immediately before they emerge from the nozzle. In this method the polymers forming the individual layers of the carrier film are plasticized in separate extruders, combined, extruded on a cooling roller, and cooled in an unstretched state. Then the unstretched film is oriented by simultaneous or multiple stretching lengthwise and crosswise, heat-fixed, cut, and wound. The characterizing feature of this method lies in the fact that the layer thickness(es) of cover layer(s) B, B' can be varied during the manufacturing process. The layer thickness(es) of the cover layer(s) B, B' is/are varied preferably by regulating the feed of the melts of the polymers forming cover layer(s) B, B' to the melt lines feeding the coextrusion nozzle, but this can also be accomplished by regulating the rpm of the assemblies provided for plasticization and transport of the polymers forming cover layer(s) B, B' to vary the layer thickness(es).

This method gives an individual skilled in the art a simple means of producing films with a wide variety of surface qualities. Films can be produced with essentially smooth surfaces on both sides, while the layer thicknesses of cover layers B, B' applied to both sides can be made sufficiently thick that all the structures present on the surfaces of base layer A can be covered, films with an essentially smooth surface and a rough surface relative thereto can be produced, in which one of the layer thicknesses of cover layer B is made sufficiently great that all the structures on base layer A are covered and in which the layer thickness of the other cover layer B can be made sufficiently small that structures in base layer A are still clearly evident on the surface of cover layer B.

EXAMPLES

The embodiments described hereinbelow are illustrative only and are intended to explain the invention in greater detail, especially by comparison with the state of the art, and are not intended to limit the scope of the present invention in any way.

EXAMPLE 1 (COMPARISON EXAMPLE)

A polyethylene terephthalate with an additive of 0.3 wt. % based on the weight of the polyethylene terephthalate, composed of uniformly distributed inorganic particles of $BaSO_4$ with an average particle diameter of 1.0 micron is extruded as a monofilm with a layer thickness of 180 microns and cooled on a cooling roller.

The resultant prefilm is heated to 82° C. by rolling and stretched lengthwise in a nip between two rollers by a factor of 3.5 and cooled immediately, then again heated to 110° C. and stretched crosswise by a factor of 3.4.

The biaxially stretched film thus produced is exposed to a temperature of 230° C. for about 2 seconds. It has nearly the same mechanical properties lengthwise and crosswise and is approximately 15 microns thick.

EXAMPLES 2 to 8 (ACCORDING TO THE INVENTION)

A polyethylene terephthalate according to Example 1 and a polyethylene terephthalate without particle additives are melted separately by means of extruders, fed to a three-layer nozzle by means of two gear pumps (metering pumps), and extruded in such fashion that the polyethylene terephthalate without particle additives covers the polyethylene terephthalate according to Example 1 with a uniform layer thickness on both the top and bottom surfaces.

The combined flow thus produced is processed in the same manner as in Example 1, but in this case as a three-layer multilayer film to produce films 15 microns thick.

During the manufacture of the multilayer film, the layer thicknesses of the cover layers are adjusted on both sides as follows by changing the rpm of the gear pumps:

| Example | 2 | 3 | 4 | 5 | 6 | 7 | 8 |
|---|---|---|---|---|---|---|---|
| Layer thickness (microns) | 0.2 | 0.3 | 0.5 | 1.0 | 1.5 | 2.0 | 2.5 |

The total thickness of the films is 15 microns each. The resultant films can be termed symmetric (BAB) films. The films used in Examples 1 and 2 to 8 are subjected to the following tests:
(a) sliding friction according to DIN 53375,
(b) roughness measurement of the surfaces according to DIN 4768 (cut off: 0.25 mm),
(c) abrasion test using a device of our own design.

A. Sliding Friction

The results of the measurements of sliding friction are summarized in Table I below:

TABLE I

| Example | Sliding Friction |
|---|---|
| 1 | 0.34 |
| 2 | 0.37 |
| 3 | 0.43 |
| 4 | 1.05 |
| 5 | >1.5 |
| 6 | >1.5 |
| 7 | >1.5 |
| 8 | >1.5 |

The film according to Example 1 has a coefficient of sliding friction of 0.34. The surface of the base layer can be covered with a cover layer with a thickness of approximately 0.2 micron without the sliding friction behavior of the resultant film by comparison to that of a noncoated film being altered significantly. Even when the cover layer has a thickness of 0.5 micron (Example 4), no serious disadvantages can be seen.

It is only when the layer thickness of the cover layer is 1.0 micron or more (Examples 5 to 8) that the surface of the film changes in such a way that it corresponds in its sliding behavior to a film without any particle additive whatever, in which "jamming" can therefore been seen.

B. Surface Roughness

The results of the measurements of surface roughness are summarized in Table II below:

TABLE II

| Example | $R_t$ (microns) | $R_a$ (microns) |
|---|---|---|
| 1 | 0.46 | 0.05 |
| 2 | 0.41 | 0.035 |
| 3 | 0.40 | 0.028 |
| 4 | 0.31 | 0.018 |
| 5 | 0.24 | 0.011 |
| 6 | 0.18 | 0.007 |
| 7 | 0.19 | 0.008 |
| 8 | 0.19 | 0.008 |

As Table II shows, varying the layer thickness of the cover layers with no particles added can greatly influence the surface roughness of the film. If the layer thickness is 1.5 microns or more, no further changes are possible.

In conjunction with the sliding friction behavior described above, in the range of layer thicknesses of cover layers from 0.5 micron or less, the surface roughness ($R_t/R_a$), which influences the quality of the magnetic signal can be adjusted without a disadvantageous loss of sliding friction within the values listed in Table II.

C. Abrasion Resistance

The abrasion behavior of films produced according to the examples was tested on a measuring device in which a film strip 12.5 mm wide was pulled at a constant web tension (1 N) over a friction roller (fixed deflecting roller from a magnetic tape cassette), then fed over two rubber rollers serving as measuring rollers, and then rolled up. The coating of the rubber rollers with abraded material was evaluated on a scale running from 1, corresponding to very little abrasion, to 6, corresponding to a great deal of abrasion. The measurement results are summarized in Table III below.

TABLE III

| Example | Abrasion |
|---|---|
| 1 | 6 |
| 2 | 3 |
| 3 | 2 |
| 4 | 1 |
| 5 | 1 |
| 6 | —(4) |
| 7 | — |
| 8 | — |

The measured values listed represent the averages of 10 individual measurements. As the thickness of the cover layers increases, there is perceptible improvement in abrasion behavior. However, no clear results could be obtained for Examples 6 to 8 since the film jammed on the friction roller and constant web tension could no longer be maintained.

We claim:

1. An abrasion-resistant, multilayer, biaxially oriented carrier film for magnetic information media, comprising
    (i) a polyester substrate layer having from 0.001 weight percent to 10 weight percent, based upon the weight of the polyester forming said substrate layer, of solid particles having an average particle size of from 0.3 to 20 microns, said particles being finely distributed throughout said substrate layer; and
    (ii) a cover layer applied to each of the two surfaces of said polyester substrate, said cover layer being a homopolyester cover layer having a maximum thickness of 40% of the thickness of said polyester substrate.

2. The abrasion-resistant, multilayer carrier film of claim 1 wherein said homopolyester cover layer has a maximum thickness of 30% of the thickness of said polyester substrate.

3. The abrasion-resistant, multilayer carrier film of claim 2 wherein said homopolyester cover layer has a maximum thickness of 15% of the thickness of said polyester substrate.

4. The abrasion-resistant, multilayer carrier film of claim 1 wherein said polyester substrate layer comprises polyethylene terephthalate having from 0.001 to 5 weight percent, based upon the weight of the polyester forming said polyester substrate layer, of said solid particles.

5. The abrasion-resistant, multilayer carrier film of claim 1 wherein said solid particles, finely distributed throughout said polyester substrate, have an average particle size of from 0.3 to 15 microns.

6. The abrasion-resistant, multilayer carrier film of claim 5 wherein said solid particles have an average particle size of from 0.5 to 5.0 microns.

7. The abrasion-resistant, multilayer carrier film of claim 1, wherein said homopolyester cover layer comprises polyethylene terephthalate.

8. The abrasion-resistant, multilayer carrier film of claim 1 wherein said homopolyester cover layer contains up to 5 weight percent of solid particles distributed throughout said homopolyester cover layer having an average particle size of less than 0.2 micron.

9. The abrasion-resistant, multilayer carrier film of claim 1 wherein the thicknesses of the two homopolyester cover layers are different.

10. The abrasion-resistant, multilayer carrier film of claim 1 wherein at least one of said homopolyester cover layers, intended for application of the magnetic coating, has a thickness of from 0.5 to 3 microns.

11. The abrasion-resistant, multilayer carrier film of claim 1 wherein at least one of said homopolyester cover layers, opposite the cover layer which is intended for application of the magnetic coating, has a thickness of from 0.1 to 2 microns.

12. The abrasion-resistant film of claim 6 wherein said solid particles posses an average particle size of about 1 micron.

13. The abrasion-resistant film of claim 6 wherein said solid particles are selected from the group consisting of silicon dioxide, aluminum dioxide, aluminum hydroxide, calcium carbonate, barium sulfate, and carbon black.

14. The abrasion-resistant film of claim 13 wherein said solid particles comprise barium sulfate.

15. The abrasion-resistant, multilayer film of claim 1 wherein
   (i) both homopolyester cover layers comprise polyethylene terephthalate.
   (ii) said polyester substrate layer contains about 0.3 weight percent of solid particles selected from the group consisting of silicone dioxide, aluminum dioxide, aluminum hydroxide, calcium carbonate, barium sulfate, anc carbon black, and said particles have an average particle size of about 1.0 micron,
   (iii) the total thickness of the multilayer film is approximately 15 microns thick, whith the idividual thickness of said homopolyester cover layers ranging from about 0.2 to about 1.5 microns.

16. A process for manufacture of an adhesion-resistant, multilayer carrier film having a central polyester substrate which contains solid particles in an amount of from 0.001 to 10% based on the weight of the polymer, said particles having a size of from 0.3 to 20 microns, and two homopolyester cover layers applied thereto, said film manufactured by a coextrusion process comprising
   (i) separately plasticizing the polyester and homopolester resins which are to form the layers of said film;
   (ii) combining said plasticized resins and extruding said resins in sheet-like form through a coextrusion nozzle;
   (iii) contacting the combined, multilayer extrudate upon a cooling roller, thereby cooling said extrudate in an unstretched state;
   (iv) biaxially orienting said cooled, multilayer extrudate to form a multilayer polyester film;
   (v) heat-fixing said biaxially oriented polyester film;
   with proviso that the thickness of said homopolyester cover layers is adjusted by either:
      (A) regulating the speed at which the plasticized polyester resins are permitted to pass to said coextrusion nozzle, or
      (B) regulating the speed of the extruders
   so that said homopolyester cover layers have maximum thickness of 40% of the thickness of said polyesters substrate.

* * * * *